(12) United States Patent
Whelan

(10) Patent No.: US 11,571,874 B2
(45) Date of Patent: Feb. 7, 2023

(54) MULTI-LAYER WOVEN FABRIC ARTICLE

(71) Applicant: Elizabeth Whelan, Portland, ME (US)

(72) Inventor: Elizabeth Whelan, Portland, ME (US)

( * ) Notice: Subject to any disclaimer, the term of this patent is extended or adjusted under 35 U.S.C. 154(b) by 289 days.

(21) Appl. No.: 16/533,511

(22) Filed: Aug. 6, 2019

(65) Prior Publication Data

US 2020/0047457 A1 Feb. 13, 2020

Related U.S. Application Data

(60) Provisional application No. 62/717,132, filed on Aug. 10, 2018.

(51) Int. Cl.
| | |
|---|---|
| *B32B 5/26* | (2006.01) |
| *B32B 5/02* | (2006.01) |
| *B32B 5/06* | (2006.01) |
| *B32B 3/28* | (2006.01) |
| *D03D 11/00* | (2006.01) |
| *B32B 5/08* | (2006.01) |
| *A47C 31/00* | (2006.01) |

(52) U.S. Cl.
CPC ............. *B32B 5/26* (2013.01); *B32B 3/28* (2013.01); *B32B 5/024* (2013.01); *B32B 5/028* (2013.01); *B32B 5/06* (2013.01); *B32B 5/08* (2013.01); *D03D 11/00* (2013.01); *A47C 31/006* (2013.01); *B32B 2307/51* (2013.01); *B32B 2479/00* (2013.01); *D10B 2401/061* (2013.01)

(58) Field of Classification Search
CPC .. B32B 5/26; B32B 3/28; B32B 5/024; B32B 5/028; B32B 5/06; B32B 5/08; B32B 2307/51; B32B 2479/00; D03D 11/00; D03D 25/00; D03D 25/005; D03D 11/02; A47C 31/006; D10B 2401/061; D10B 2403/033; D10B 2403/0331; D10B 2403/0333
USPC ...... 442/205, 206; 139/408–415, 384 R–390
See application file for complete search history.

(56) References Cited

U.S. PATENT DOCUMENTS

| | | | | |
|---|---|---|---|---|
| 3,009,232 A | * | 11/1961 | Martin | ............ D03D 3/00 428/116 |
| 5,508,094 A | * | 4/1996 | McCarthy | ............ D21F 7/083 428/223 |

(Continued)

FOREIGN PATENT DOCUMENTS

| | | | |
|---|---|---|---|
| DE | 9419009 U1 | 2/1995 | |
| EP | 2408957 A1 | * 1/2012 | ......... D03D 1/0064 |

(Continued)

OTHER PUBLICATIONS

International Searching Authority/US—International Search Report and the Written Opinion of the International Searching Authority, International Application No. PCT/US2019/045332, 19 pages, dated Oct. 24, 2019.

(Continued)

*Primary Examiner* — Travis M Figg
(74) *Attorney, Agent, or Firm* — Sunstein LLP

(57) ABSTRACT

A multi-layer article of woven fabric includes a woven base layer; a woven mesh layer, disposed above the base layer, the mesh layer utilizing a first common warp for each one of a plurality of stacked wefts; and a woven binding layer, disposed above the mesh layer. The base layer and the binding layer share a second common warp.

19 Claims, 4 Drawing Sheets

(56) References Cited

U.S. PATENT DOCUMENTS

| | | | | |
|---|---|---|---|---|
| 5,713,396 A * | 2/1998 | Lee | .................. | D21F 1/0054 |
| | | | | 139/408 |
| 6,010,652 A * | 1/2000 | Yoshida | .................. | D03D 11/02 |
| | | | | 139/389 |
| 6,186,966 B1 * | 2/2001 | Grim | .................. | A61F 13/04 |
| | | | | 128/878 |
| 6,810,917 B2 * | 11/2004 | Stone | .................. | D21F 1/0036 |
| | | | | 162/903 |
| 9,328,436 B2 * | 5/2016 | Russell | .................. | A62B 35/04 |
| 2003/0211797 A1 * | 11/2003 | Hill | .................. | H05K 1/038 |
| | | | | 442/205 |
| 2004/0009729 A1 * | 1/2004 | Hill | .................. | D03D 11/00 |
| | | | | 442/181 |
| 2009/0191777 A1 * | 7/2009 | Liao | .................. | D03D 13/004 |
| | | | | 264/103 |
| 2010/0108176 A1 * | 5/2010 | Golz | .................. | D03D 11/00 |
| | | | | 139/409 |
| 2012/0175009 A1 * | 7/2012 | Danby | .................. | D21F 1/0027 |
| | | | | 139/420 R |
| 2014/0273697 A1 * | 9/2014 | Russell | .................. | D03D 1/0094 |
| | | | | 139/11 |
| 2016/0289869 A1 * | 10/2016 | Shahkarami | .................. | D03D 15/43 |
| 2019/0017885 A1 * | 1/2019 | Horter | .................. | G01L 1/146 |
| 2020/0047457 A1 * | 2/2020 | Whelan | .................. | D03D 15/56 |

FOREIGN PATENT DOCUMENTS

| | | | | |
|---|---|---|---|---|
| EP | 2408957 B1 | 4/2017 | | |
| GB | 853697 A | 11/1960 | | |
| WO | WO-0166856 A1 * | 9/2001 | .......... | D21F 1/0036 |
| WO | 2017174505 | 10/2017 | | |
| WO | WO-2017174505 A1 * | 10/2017 | ............ | B32B 5/024 |

OTHER PUBLICATIONS

European Patent Office, Supplementary European Search Report dated Apr. 8, 2022 for EP Application No. 19848147.5, 9 pages.

* cited by examiner

MULTI-LAYER WOVEN FABRIC ARTICLE

RELATED APPLICATION

The present application claims the benefit of provisional patent application Ser. No. 62/717,132 filed on Aug. 10, 2018, by Elizabeth Whelan. That related application is hereby incorporated herein by reference in its entirety.

TECHNICAL FIELD

The present invention relates to textiles, and more particularly to textile spacer fabrics.

BACKGROUND ART

In ergonomic furniture manufacturing, there are two common methods used to create a seat. The first method produces an upholstered seat. It includes an outer shell, an inner shell, a foam cushion, and a fabric. Sometimes, two foam cushions are employed. A textile is applied to cover all components except the outer shell, and provides visual and tactile aesthetics.

The second method is the suspended seat. A textile is applied in or over a frame and put under tension. The textile, the seat frame and the back frame are the only components of the seat. Each method has its own benefits and disadvantages.

While an upholstered seat offers long term comfort, the comfort can be compromised if the cushion is too soft. A soft cushion allows a person's weight to sink too far down. The most comfortable foam seats have two foam components. This is achieved by combining a softer-dense foam layer with a closed-cell medium-dense foam layer. However, over time the foam cushions break down. The breakdown happens with use, but it can also occur from an abrasive fabric. Often the fabric is glued to the cushion for stability, yet over time the fabric delaminates as the glue loses effectiveness. The other components, such as the outer shell and inner shell, can crack with continuous use. Lastly, there is the problem of breathability and heat buildup. Cushions typically do not breathe and do not disburse heat. The combination of four to five components prevents breathability and results in discomfort for long-term sitting.

The second method applies fabric in suspension over or onto a seat and back frame. This allows for breathability if the fabric is porous, such as a mesh textile. Various woven and knitted mesh textiles are applied in suspension in furniture. The seat and back are constructed of two components: (i) a frame for a seat or back and a (ii) textile. The textile has some elasticity, so as to be both supportive and comfortable. The textile may be knitted or woven. However, textiles give limited support and comfort to the user. If the fabric has considerable elasticity, it does not sufficiently support the weight of the body. (A person in a seated position presents approximately 75% of the total body weight to the chair.) If the fabric is supportive, it might not offer comfort. Fabrics applied in suspension often use rigid yarns or other materials strong enough to support the weight of a human. Some of examples of rigid materials are monofilament yarns or cellulose yarns such as rattan. This seating surface does not distribute the weight of the sitter and is often abrasive to the touch and to clothing. Thus, the seating experience does not offer long-term comfort. A person sits "on" a suspended seat, whereas a person sits "in" a conventional seat. Aesthetically, mesh fabrics integrate easily into interior environments.

There is a third, but not widely used, method, which combines three materials together into a thin seat cushion and applies it in suspension. The components are a rigid under-fabric, a thin piece of sculpted foam and a soft elastic upholstery textile. All three materials are sewn together to create a cushion. While this combination offers good comfort and support, there are drawbacks. First, separate materials are used to make the cushion. Second, the cushion is not breathable. Third, it requires the combination of three different materials working separately from each other, but within the same package. These materials have characteristics that work against the other. For example, the rigid under-fabric is a harsher material than the soft foam. Continuous use results in stress and abrasion from the top and bottom of the foam cushion. It is likely that it wears out the cushion faster than on a typical upholstered cushion seat as described in the first method. Fourth, the use of three materials requires more materials cost and labor to create the item. This increases the risk of mistakes and miscalculations.

SUMMARY OF THE EMBODIMENTS

In accordance with one embodiment of the invention, there is provided a multi-layer article of woven fabric. This embodiment includes:

a woven base layer;

a woven mesh layer, disposed above the base layer, the mesh layer utilizing a first common warp for each one of a plurality of stacked wefts; and a woven binding layer, disposed above the mesh layer.

The base layer and the binding layer share a second common warp. In a related embodiment, the multi-layer article further includes a pattern layer, disposed above the binding layer; the pattern layer shares the second common warp of the base layer and the binding layer. Optionally, the second common warp is made of a multifilament yarn that is resistant to deflection. Also, optionally, the stacked wefts of the mesh layer are made of resilient yarn, such as a monofilament yarn, which may be nylon or polyester. As a further option, the first common warp of the mesh layer is made of resilient yarn. In a related option, both the first common warp of the mesh layer and the stacked wefts of the mesh layer are made of resilient yarn. Also optionally, the weft of the base layer is made of a multifilament yarn that is resistant to deflection.

In another related embodiment, the second common warp includes yarn that is elastic, so as to render the fabric stretchable in the warp direction. Optionally, the second common warp includes yarn selected from the group consisting of a wrapped yarn and a tacked yarn and combinations thereof. In further related embodiment, least one of the wefts includes yarn that is elastic, so as to render the fabric stretchable in the weft direction. Optionally, the wefts of the binding layer and the pattern layer include yarn that is elastic,

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Definitions. As used in this description and the accompanying claims, the following terms shall have the meanings indicated, unless the context otherwise requires:

A "mesh layer" is a layer that is woven from a common warp with a plurality of stacked wefts, wherein yarns used in the warp and in the weft are resilient.

A yarn that is "resilient" is a yarn that when bent or deflected will tend to return strongly to its original position. Examples of such a yarn include monofilament fibers, such as of nylon or polyester.

A yarn that is "resistant to deflection" is a yarn that when bent or deflected will tend to return to its original position. Examples of such a yarn include multifilament fibers, such as of nylon or polyester.

A "wrapped" yarn is a composite yarn having an elastic core of a first composition that is wrapped with an inelastic exterior of a second composition, wherein the wrapping protects the elastic core and allows expansion and contraction of the exterior in cooperation with expansion and contraction of the elastic core.

In various embodiments, the present invention provides a "spacer fabric," which is a three-dimensional multi-layer fabric having a system of interconnecting yarns that connect the face and back. Among other things, the spacer fabric of these embodiments is suitable for use in furniture applications, particularly as a suspension material in seating applications. The spacer fabric of this embodiment can be used in lieu of cushions for either the back or the seat of a chair. The spacer fabric of this embodiment is stable, breathable, cushioning, resilient, strong, aesthetic in terms of appearance and texture, and provides good ergonomic support while also reducing the need for multiple components. In various embodiments, the fabric is made on a conventional production loom using two beams to create multiple layers, and, in one embodiment, has five layers.

Figure 1:
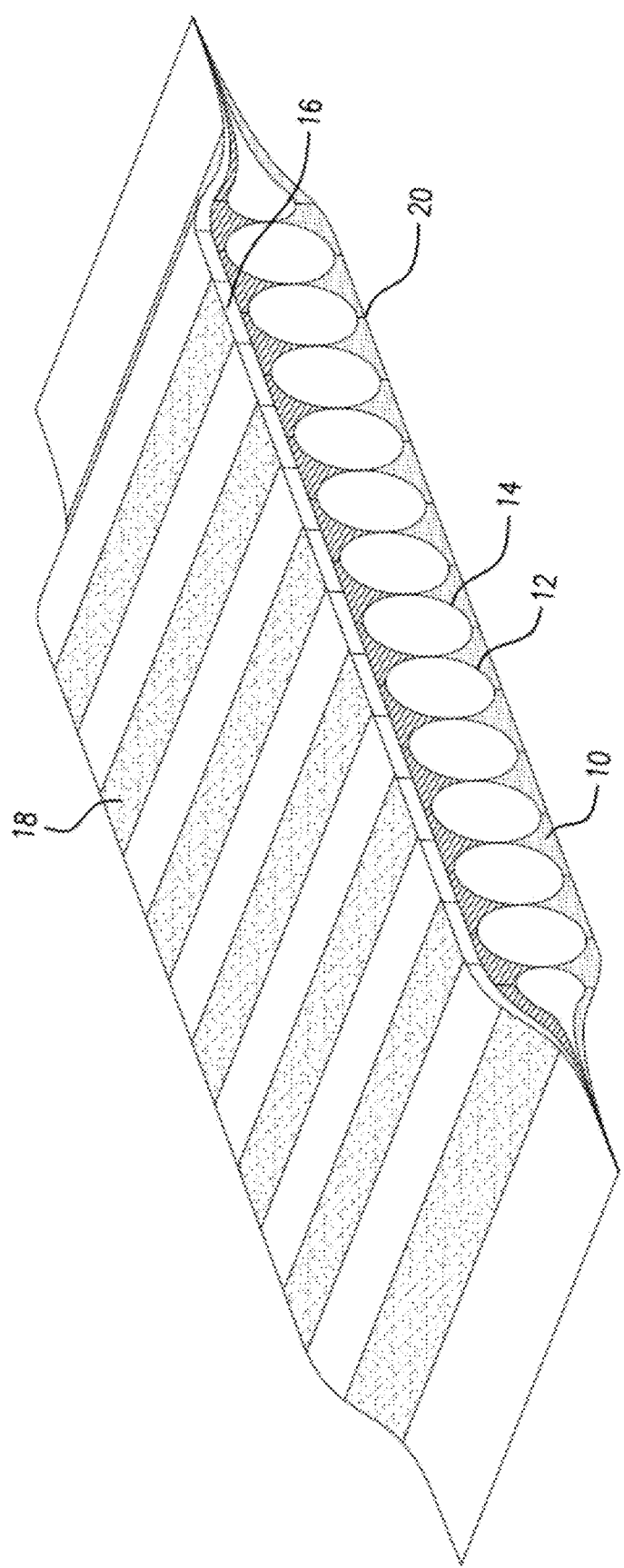
FIG. 1 is a perspective sectional view of a multi-layer article of woven fabric in accordance with an embodiment of the present invention, with the section cut in a direction parallel to the warps of the article, and showing wefts in the section.
Figure 2:
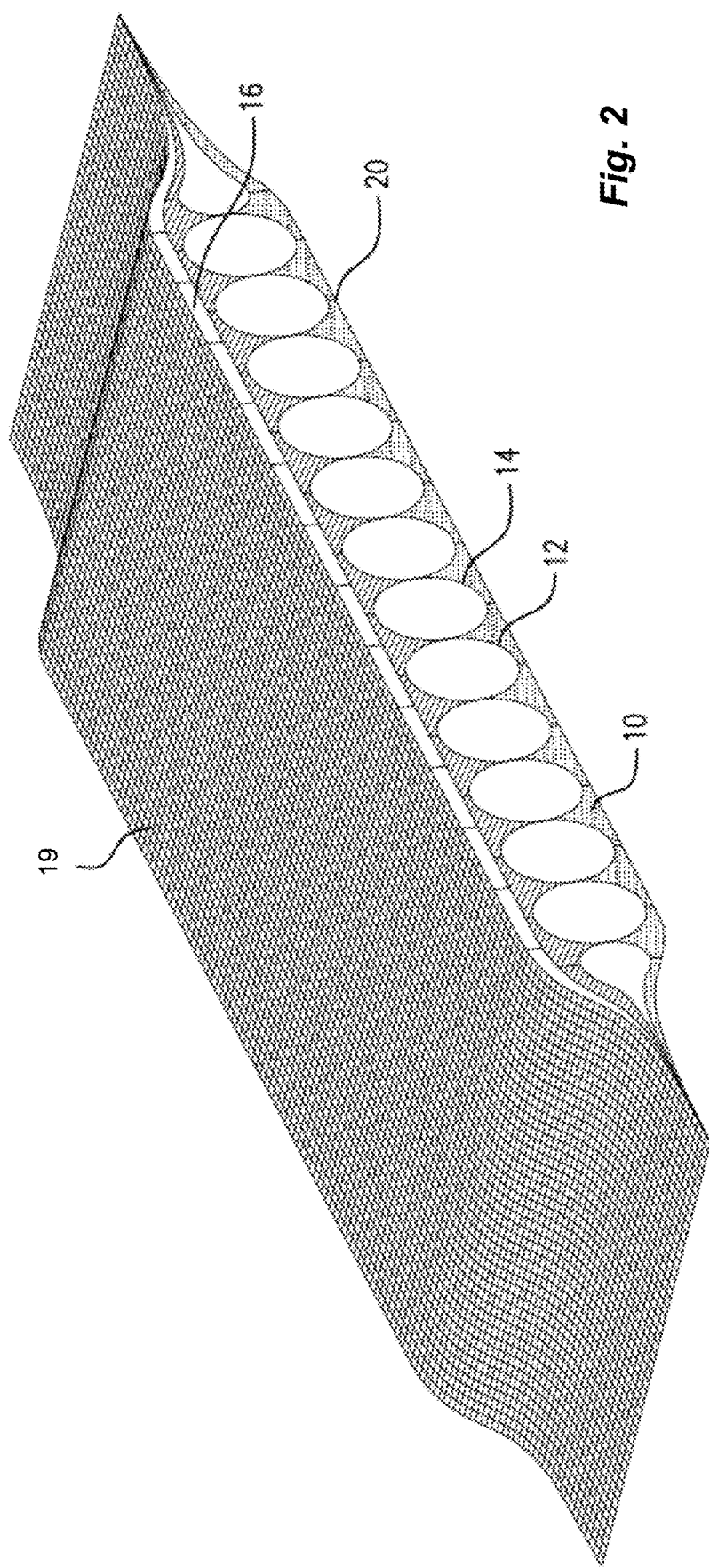
FIG. 2 is a similar sectional view of the embodiment of FIG. 1, with the pattern layer 18 removed so as to expose the upper surface 19 of binding layer 16.

FIG. 1 is a perspective sectional view of a multi-layer article of woven fabric in accordance with an embodiment of the present invention, with the section cut in a direction parallel to the warps of the article, and exposing wefts of the embodiment. FIG. 2 is a similar sectional view of the embodiment of FIG. 1, with the pattern layer 18 removed so as to expose the binding layer 19. The embodiment is woven in five layers and constructed from two separate warps. The base layer 10 and the pattern layer 18 are connected to each other by a system of interconnected layers. These interconnected layers are the mesh layer 12 and the binding layer 16. Each layer has a specific function. The thickness between the face (i.e. the exposed side of the pattern layer 18 and the back (i.e. the exposed side 20 of the base layer) is 8 to 15 millimeters, depending on the requirements for bearing weight, deflection and comfort.

In one embodiment, there are five layers to the fabric when it is opened up. The layers can also be compressed into one layer. The base layer has two sides, the back 20 and the face 10. The back 20 is the backside of the whole fabric. The base layer provides stability for the other four layers and consequently has little stretch. The base layer is firm and gives support to the weight of the sitter. The face 10 of the base layer is connected by a plurality of binding points to the mesh layer 12. Although we refer to "mesh layer 12," in this embodiment, the mesh layer in fact has two sublayers, which we term below "mesh layer A" and "mesh layer B". Mesh layer A corresponds to item 12 in FIGS. 1 and 2, and mesh layer B corresponds to item 14 in FIGS. 1 and 2. The mesh layer serves as a spacer layer, which is woven in various embodiments with resilient yarns into a structure that allows for breathability, air circulation and deflection. The mesh layer takes on the function of foam in a cushion; the mesh layer is breathable and has better deflection and longevity than standard foam used in seats.

The binding layer 16 is disposed above the mesh layer 12 and is bound to it. The binding layer 16 can be implemented with a thin polyester yarn in the weft with an elastic warp yarn; the thin weft yarn is strong. As one option the weft can be transparent; the transparency of the weft yarn prevents it from interfering visually with the pattern layer 18. Alternatively, the weft is not transparent and provides content that can be integrated into the pattern layer. The pattern layer 18 is disposed above the binding layer 16. The exposed face of the pattern layer 18 can be configured for visual appeal and suitable tactile surface development. In this fashion, the pattern layer can be used to establish visual and tactile aesthetics including pattern, color, texture, tactile surface and surface design. No binding points show on the face of the pattern layer 18. Nevertheless, in some embodiments, the pattern layer is omitted, and the binding layer is the uppermost layer of the fabric, and will show on its surface the plurality of connection points with the mesh layer. In fact, in yet another embodiment, both the pattern layer and the binding layer are omitted, in which case, the mesh layer is the uppermost layer of the fabric and serves as the face of the fabric.

Figure 3:
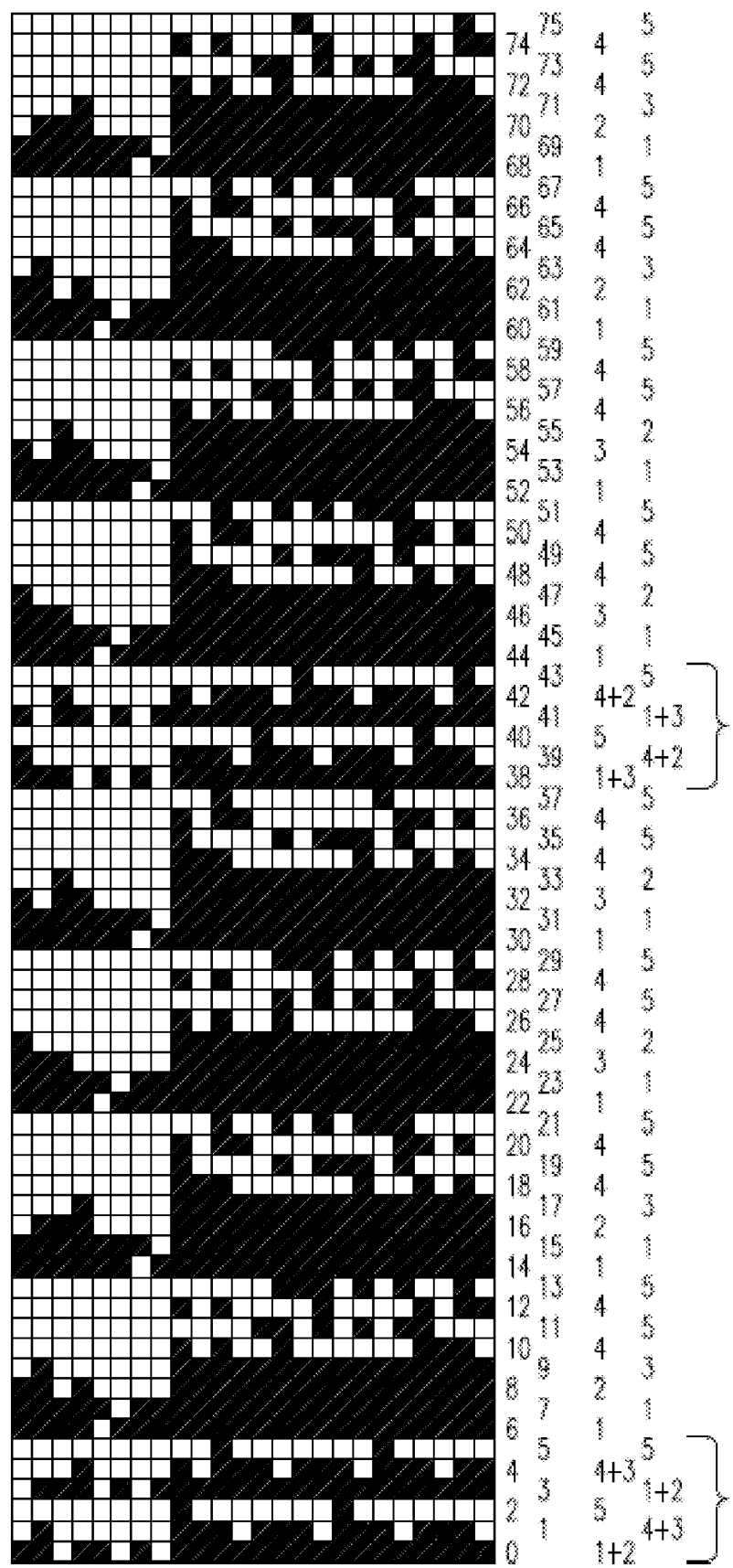
FIG. 3 illustrates warp construction by providing a pick chart for operation of heddles of a loom used to achieve the embodiment of FIGS. 1 and 2.
Figure 4:
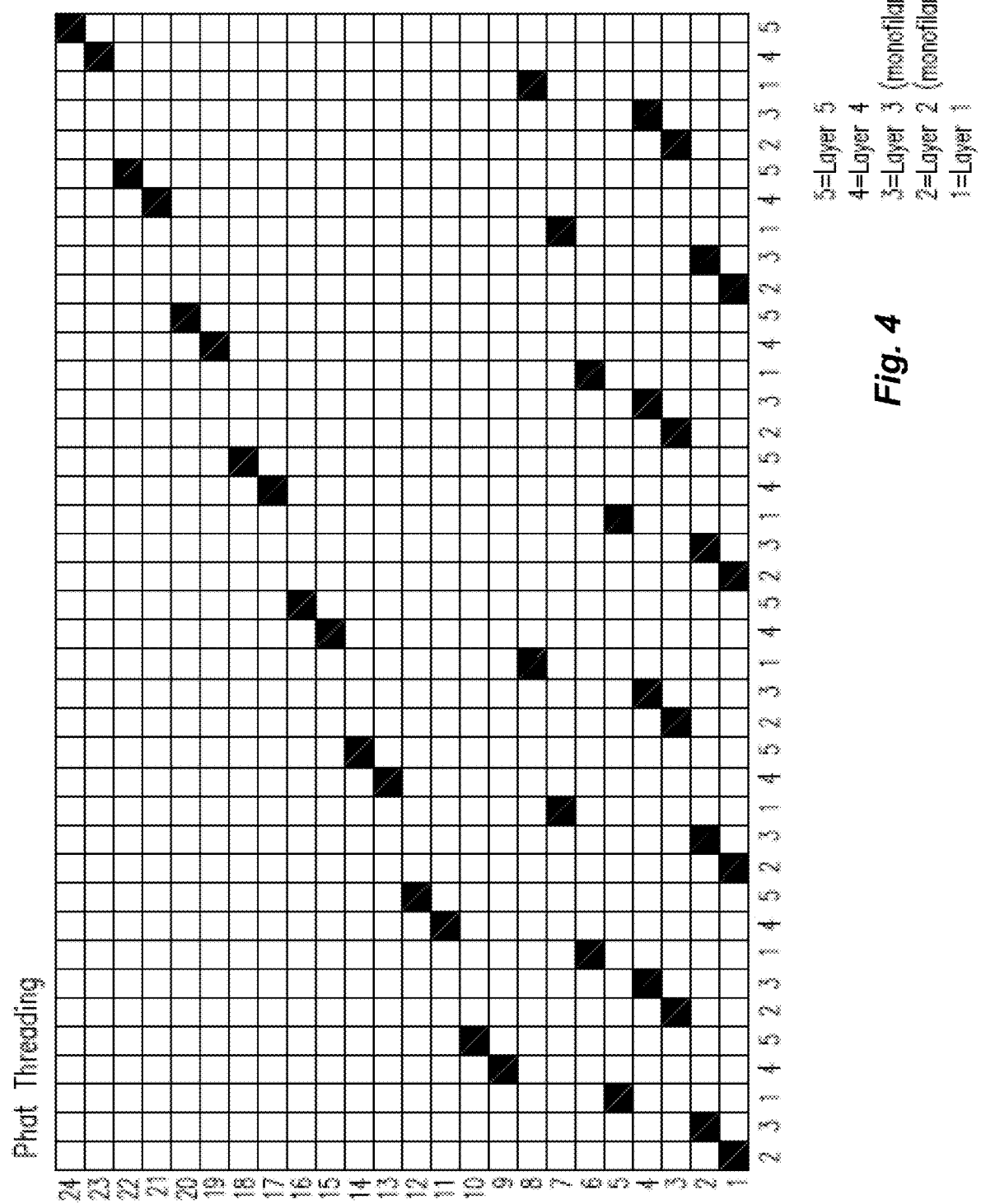
FIG. 4 is a warp threading chart for the same embodiment.

FIG. 3 illustrates a pick chart for operation of heddles of a loom used to achieve the embodiment of FIGS. 1 and 2. The fabric is a standard double-weave construction, which is found in mechanized weaving. The two warps, WARP A (corresponding to the first common warp in various embodiments herein) and WARP B (corresponding to the second common warp in such embodiments) are wound on separate beams, because each warp uses different yarns having different densities. Two separate beams provide better control over tension in weaving and in the final fabric. There is, at present, a 76 pick rotation to complete one woven repeat. (This can be altered if the monofilament weaves are shorter.) The weft yarns are arranged from a four to eight box sequence. Both double-beam and an eight-box sequence are standard on mechanized looms.

The second common warp, which is employed in all layers other than the mesh layer, is a stretch yarn using an elastic in its core. It is either wrapped with or tacked to a carrier yarn. This carrier yarn is made of polyester or nylon, although other materials can be used, as long as they can be wrapped or tacked to the elastic yarn. The total yarn density of this yarn is 87 to 250 denier. The first common warp, which is employed in the mesh layer, is a resilient yarn, and, in various embodiments is implemented as a monofilament yarn. The monofilament yarn has some elasticity. The dimension of this yarn is 850 dtex or 750 denier. The proportion of the two warps is 2:3. There are two monofilament ends to three elastic ends.

The stretch yarn provides softness in the base layer 10, binding layer 16 and pattern layer 18. The monofilament yarn used in the mesh layer 12 provides resilience and long-term strength. It provides a weave structure that is breathable and a material that withstands stress and weight. In this embodiment, the combination of these two yarns, namely the monofilament yarn and the stretch yarn, provides a soft but strong fabric. Each layer is woven independently, and each layer is connected to another layer. The independence and the interconnectedness of the layers allows distinct contributions to the effect from each layer. Each layer uses independent weft yarns.

The construction of various embodiments of the present invention renders them breathable. The fabric is breathable. The resilient yarns in the warp and weft, the double-weave structure and the shifting positions in mesh layers create a hollow space in the middle of the fabric. FIG. 1 thus shows the hollow center established in conjunction with the mesh layer 12. The fabric captures the breathable function of a mesh fabric, because the open spacer structure in the mesh layer provides air-circulation and prevents heat build-up. The lack of heat build-up provides more comfort to the user.

In various embodiments, the shape of the fabric can be defined by the mesh layer. In particular, by changing the number of picks in the mesh layer, a structural curve can be embedded in the fabric. For example, FIG. 3 shows twelve picks in each of the monofilament layers before their position is shifted. Picks 0, 1, 3, 4, 8, 16, and 17 show that mesh layer A weaves below mesh layer B. At pick 22 the positions of the mesh layers shift: mesh layer A weaves above mesh layer B as shown in picks 24, 25, 32, 33, 38 39, 41, 41, 46, 47, 54, and 55. At pick 60, the mesh layers change position again. Mesh layer A weaves below Mesh layer B as shown in picks 62, 63, 70, and 71. If the number of picks in each mesh layer decreases, the dimension created by the mesh layers becomes correspondingly smaller. For example, if the number of picks decreases from 12 picks to 6 picks and then is increased back to 12 picks, the fabric will curve. This feature allows the designer to replicate a seat cushion's curve. The intent is to replicate the curve so that the textile can disperse the sitter's weight and provide longer term comfort.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A multi-layer article of woven fabric comprising:
   a woven base layer;
   a woven mesh layer, disposed above the base layer, the mesh layer utilizing a first common warp for each one of a plurality of stacked wefts;
   a woven binding layer, disposed above the mesh layer; and
   a pattern layer, disposed above the binding layer,
   wherein:
   (a) the base layer, the binding layer, and the pattern layer employ a second common warp, distinct from the first common warp,
   (b) each of the base layer and the binding layer is woven in a manner as to be separately bound to the mesh layer,
   (c) the mesh layer is devoid of any contribution from the second common warp, and
   (d) the face of the pattern layer is devoid of any visible binding point.

2. A multi-layer article of woven fabric according to claim 1, wherein the second common warp is made of a multi-filament yarn that is resistant to deflection.

3. A multi-layer article of woven fabric according to claim 1, wherein the stacked wefts of the mesh layer are made of resilient yarn.

4. A multi-layer article of woven fabric according to claim 1, wherein the first common warp of the mesh layer is made of resilient yarn.

5. A multi-layer article of woven fabric according to claim 1, wherein the weft of the base layer is made of a multi-filament yarn that is resistant to deflection.

6. A multi-layer article of woven fabric according to claim 1, wherein the stacked wefts of the mesh layer are made of resilient yarn.

7. A multi-layer article of woven fabric according to claim 1, wherein the first common warp of the mesh layer is made of resilient yarn.

8. A multi-layer article of woven fabric according to claim 7, wherein the stacked wefts of the mesh layer are made of resilient yarn, so that both the first common warp of the mesh layer and the stacked wefts of the mesh layer are made of resilient yarn.

9. A multi-layer article of woven fabric according to claim 8, wherein the second common warp includes yarn selected from the group consisting of a wrapped yarn and a tacked yarn and combinations thereof.

10. A multi-layer article of woven fabric according to claim 1, wherein the second common warp includes yarn that is elastic, so as to render the fabric stretchable in the warp direction.

11. A multi-layer article of woven fabric according to claim 10, wherein the second common warp includes yarn selected from the group consisting of a wrapped yarn and a tacked yarn and combinations thereof.

12. A multi-layer article of woven fabric according to claim 11, wherein at least one of the wefts includes yarn that is elastic, so as to render the fabric stretchable in the weft direction.

13. A multi-layer article of woven fabric according to claim 12, wherein the wefts of the binding layer and the pattern layer include yarn that is elastic.

14. A multi-layer article of woven fabric according to claim 1, wherein the mesh layer is woven in a manner to embed, in the article of woven fabric, a structural curve.

15. A multi-layer article of woven fiber according to claim 1, wherein the first common warp uses a first yarn and the second common warp uses a second yarn, different from the first yarn, the first yarn and the second yarn having different densities.

16. A multi-layer article of woven fabric according to claim 1, wherein the mesh layer has a first sublayer and a second sublayer, the first and second sublayers being woven so that the first mesh sublayer is alternately above and below the second mesh sublayer, thereby creating a double-weave structure having hollow spaces.

17. A multi-layer article of woven fabric according to claim 1, wherein the base layer and the binding layer are configured to avoid intersecting.

18. A multi-layer article of woven fabric according to claim 1, wherein the second common warp is employed in all layers other than the mesh layer.

19. A multi-layer article of woven fabric according to claim 1, wherein the mesh layer employs no warp other than the first common warp.

* * * * *